US012562485B2

(12) United States Patent
Belgiovane et al.

(10) Patent No.: US 12,562,485 B2
(45) Date of Patent: Feb. 24, 2026

(54) PROBE-FED CIRCULARLY-POLARIZED STACKED CENTER-SLOTTED PATCH ANTENNA

(71) Applicant: Raytheon Company, Waltham, MA (US)

(72) Inventors: Domenic John Belgiovane, Tuscon, AZ (US); Chad M. Wangsvick, Tucson, AZ (US)

(73) Assignee: Raytheon Company, Arlington, VA (US)

( * ) Notice: Subject to any disclaimer, the term of this patent is extended or adjusted under 35 U.S.C. 154(b) by 168 days.

(21) Appl. No.: 18/187,769

(22) Filed: Mar. 22, 2023

(65) Prior Publication Data

US 2024/0322433 A1 Sep. 26, 2024

(51) Int. Cl.
*H01Q 9/04* (2006.01)
*H01Q 1/48* (2006.01)
*H01Q 21/24* (2006.01)

(52) U.S. Cl.
CPC ............. *H01Q 9/0414* (2013.01); *H01Q 1/48* (2013.01); *H01Q 9/0442* (2013.01); *H01Q 9/045* (2013.01); *H01Q 21/24* (2013.01)

(58) Field of Classification Search
CPC ...... H01Q 9/0414; H01Q 1/48; H01Q 9/0442; H01Q 9/045; H01Q 21/24; H01Q 9/0428; H01Q 21/20
See application file for complete search history.

(56) References Cited

U.S. PATENT DOCUMENTS 4,218,682 A 8/1980 Yu
7,106,255 B2 9/2006 du Toit
7,109,926 B2 9/2006 du Toit
(Continued)

FOREIGN PATENT DOCUMENTS

CN 105932419 A 9/2016
CN 109301444 A 2/2019
(Continued)

OTHER PUBLICATIONS

Jun-Hwa Oh, Young-Pyo Hong and Jong-Gwan Yook, "Dual circularly-polarized stacked patch antenna for GPS/SDMB," 2008 IEEE Antennas and Propagation Society International Symposium, San Diego, CA, USA, 2008, pp. 1-4, doi: 10.1109/APS.2008.4619890. (Year: 2008).*

(Continued)

*Primary Examiner* — Dieu Hien T Duong
*Assistant Examiner* — Austin M Back

(57) ABSTRACT

Described herein is a stacked patch antenna, an array of stacked patch antennas, and a method of fabricating a stacked patch antenna. The stacked patch antenna comprises a ground plane, a first substrate on the ground plane, a first patch on the first substrate having a first diagonal non-radiating center slot from a side of the first patch, a second substrate on the first patch, a second patch on the second substrate having a second diagonal non-radiating center slot from a side of the second patch similar to the side of the first patch, and a feed connector having a first conductor directly connected to the ground plane and a second conductor capacitively connected to the first patch and directly connected to the second patch.

20 Claims, 4 Drawing Sheets

(56) References Cited

U.S. PATENT DOCUMENTS

| | | | | |
|---|---|---|---|---|
| 8,482,475 | B2 | 7/2013 | Tiezzi et al. | |
| 8,633,856 | B2 | 1/2014 | Rao | |
| 9,673,526 | B1 | 6/2017 | Jensen et al. | |
| 2004/0027285 | A1 | 2/2004 | Fang | |
| 2009/0058731 | A1 | 3/2009 | Geary et al. | |
| 2014/0320356 | A1 | 10/2014 | Bishop | |
| 2019/0319367 | A1 | 10/2019 | Edwards et al. | |
| 2020/0106194 | A1 * | 4/2020 | Takaki | H01Q 9/0457 |
| 2022/0344806 | A1 * | 10/2022 | Cho | H01Q 1/48 |
| 2023/0088794 | A1 * | 3/2023 | Pandey | H01Q 5/392<br>343/702 |

FOREIGN PATENT DOCUMENTS

| | | | |
|---|---|---|---|
| CN | 114122705 | A | 3/2022 |
| WO | 2021181318 | A1 | 9/2021 |

OTHER PUBLICATIONS

M. N. Zahid, J. Jiang, N. Ashraf and M. S. Nazirb, "Tri-Band Circularly Polarized Micro-Strip Patch Antenna for GPS and DVB-H Applications," 2019 16th International Bhurban Conference on Applied Sciences and Technology (IBCAST), 2019, pp. 1029-1033, doi: 10.1109/IBCAST.2019.8667208 (Year: 2019).*

Y. P. Kosta, K. P. Kaur and T. Upadhaya, "Multiple Resonance Dual-Layer Antenna using Fixed Feed Point Concept and Offset Technique" 2022 IEEE Microwaves, Antennas, and Propagation Conference (MAPCON), Bangalore, India, 2022, pp. 1757-17 (Year: 2022).*

Bhutani et al., "122 GHZ Aperture-Coupled Stacked Patch Microstrip Antenna in LTCC Technology;" Conference Paper from 10$^{th}$ European Conference on Antennas and Propagation (EuCAP); Apr. 2016; 6 Pages.

Chen et al., "A Compact Dual-Band GPS Antenna Design;" IEEE Antennas and Wireless Propagation Letters, vol. 12; Feb. 20, 2013; 4 Pages.

Falade et al., "Stacked Patch Circular Polarized Antenna for GPS/ Galileo Receiver Applications;" Proceedings of the 6$^{th}$ European Conference on Antennas and Propagation (EUCAP); Mar. 2012; 4 Pages.

Klionovski et al., "Physically Connected Stacked Patch Antenna Design with 100% Bandwidth;" Proceedings of the IEEE Antennas and Wireless Propagation Letters, vol. 16; Nov. 1, 2017; 4 Pages.

Shukla et al., "Single Feed Stacked Circularly Polarized Patch Antenna for Dual Band NavIC Receiver of Launch Vehicles;" Proceedings of the IEEE Indian Conference on Antennas and Propagation (InCAP); Oct. 6, 2019; 6 Pages.

International Search Report and Written Opinion of the International Searching Authority dated May 3, 2024 in connection with International Patent Application No. PCT/US2024/010374, 12 pages.

Zahid et al., "Tri-Band Circularly Polarized Micro-Strip Patch Antenna for GPS and DVB-H Applications," 16th International Bhurban Conference on Applied Sciences and Technology (IBCAST), IEEE, Jan. 2019 , 5 pages.

Office Action issued Apr. 22, 2025 in connection with Taiwanese Patent Application No. 113100715, 15 pages.

Office Action dated Dec. 19, 2025, in connection with Taiwanese Application No. 113100715, 22 pages.

* cited by examiner

PROBE-FED CIRCULARLY-POLARIZED STACKED CENTER-SLOTTED PATCH ANTENNA

STATEMENT OF GOVERNMENT INTEREST

This invention was made with government support under U.S. Government Contract Number N00030-19-C-0025. The government has certain rights in the invention.

BACKGROUND

Conventional corner-clipped patch antennas exhibit narrow bandwidth and high inter-element coupling which degrades antenna performance (e.g., reduces gain and degrades phase dispersion characteristics).

SUMMARY

In accordance with the concepts described herein, example circularly-polarized stacked center-slotted patch antenna devices and methods provide an antenna with a single feeding circuit.

In accordance with the concepts described herein, example circularly-polarized stacked center-slotted patch antenna devices and methods provide a dual-band, a tri-band, or a higher-band antenna with a single feeding circuit and a plurality of stacked patch antenna elements.

DESCRIPTION OF THE SEVERAL VIEWS OF THE DRAWINGS

The manner and process of making and using the disclosed embodiments may be appreciated by reference to the figures of the accompanying drawings. It should be appreciated that the components and structures illustrated in the figures are not necessarily to scale, emphasis instead being placed upon illustrating the principles of the concepts described herein. Like reference numerals designate corresponding parts throughout the different views. Furthermore, embodiments are illustrated by way of example and not limitation in the figures, in which.

DETAILED DESCRIPTION

The present disclosure provides exemplary circularly-polarized stacked center-slotted patch antenna with a single feeding circuit. The antenna (e.g., a Global Positioning System (GPS) antenna) may be a dual-band, a tri-band, or a higher band antenna with a single feeding circuit and a plurality of stacked patch antenna elements.

Figure 1A:
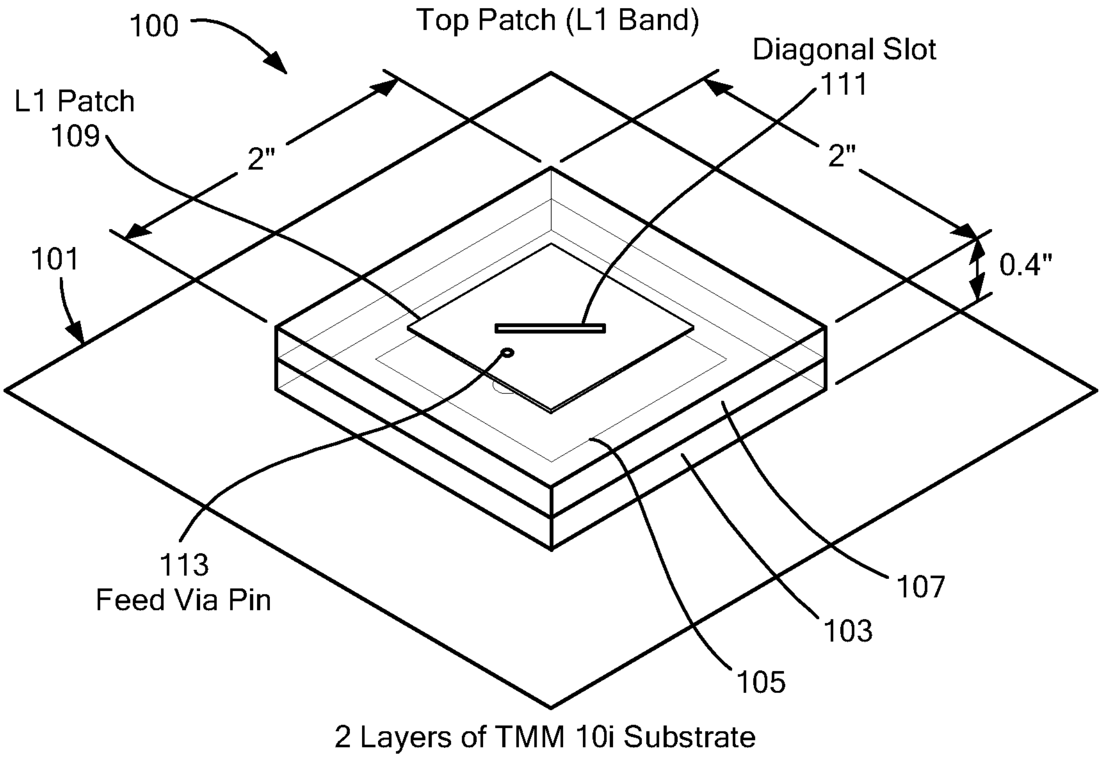
FIG. 1A is an illustration of an example embodiment of a dual-band circularly-polarized stacked center-slotted patch antenna.

FIG. 1A is an illustration of an example embodiment of a stacked patch antenna 100. In an example embodiment, the stacked patch antenna 100 comprises a ground plane 101, a first substrate 103, a first patch 105, a second substrate 107, a second patch 109, and a feed connector 113. Thus, the stacked patch antenna 100 comprises a dual-band circularly-polarized stacked center-slotted patch antenna with a single feeding circuit (e.g., L1 and L2 bands for GPS at 1.57542 GHz and 1.2276 GHZ, respectively). However, the present disclosure is not limited thereto. In an example embodiment, the stacked patch antenna 100 may include more than two patches.

Figure 2:
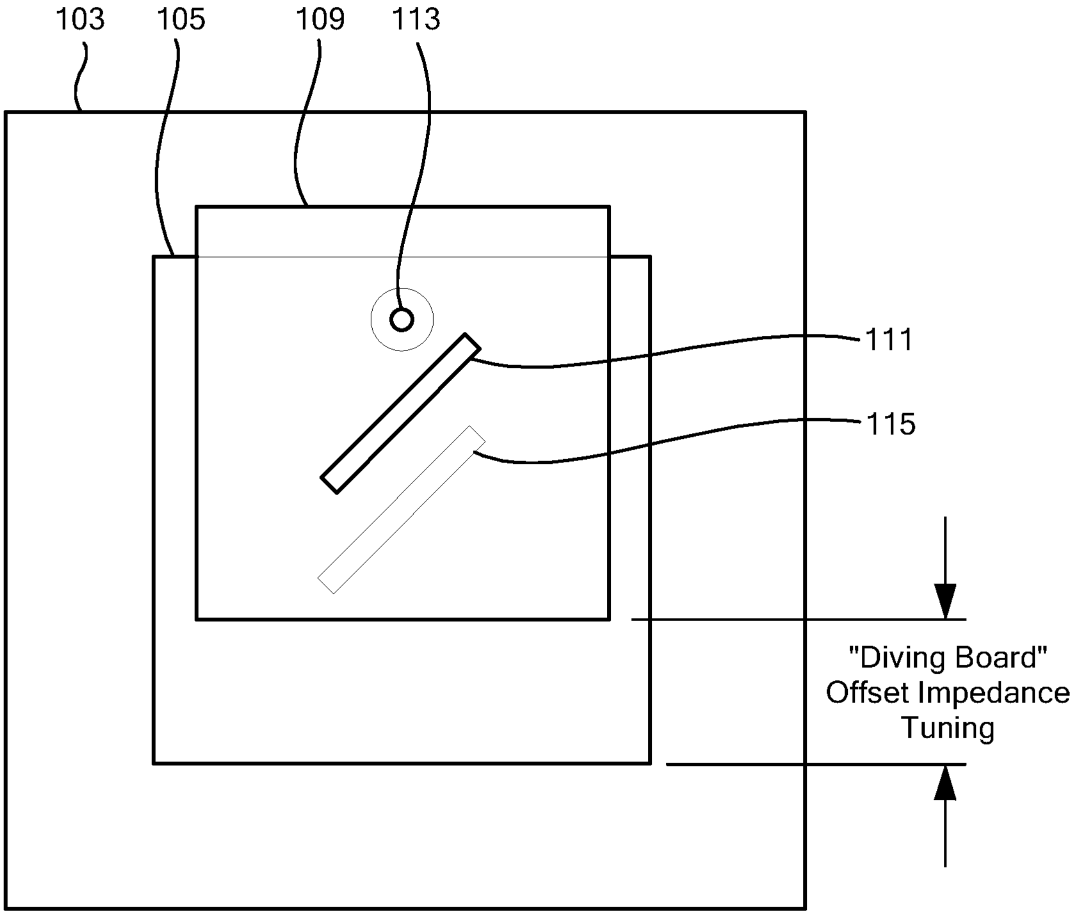
FIG. 2 is an illustration of an example embodiment of a dual-band circularly-polarized stacked center-slotted patch antenna with offset impedance tuning.

The ground plane 101 is a conductive material (e.g., a metal, copper, etc.). The ground plane 101 is illustrated in FIG. 1A as being 4 inches long and 4 inches wide. However, the present disclosure is not limited thereto. The ground plane 101 may be any dimension. In an example embodiment, the ground plane 101 may be connected to an outer conductor or shield of a coaxial connector used of the feed connector 113 as illustrated in FIG. 2 and described below in more detail, where a center conductor of the coaxial conductor may be used to supply radio frequency (RF) power to the first patch 105.

The first substrate 103 is an insulating material (e.g., ceramic) on the ground plane 101. In an example embodiment, the first substrate 103 may be an isotropic thermoset microwave material (i.e., a ceramic thermoset polymer composite) such as Rogers Corporation TMM® 10i laminate. The first substrate 103 is illustrated in FIG. 1A as being 2 inches long, 2 inches wide, and 0.2 inches high (e.g., a small form factor which is advantageous for an antenna array). However, the present disclosure is not limited thereto. The first substrate 103 may be any dimension.

Figure 1B:
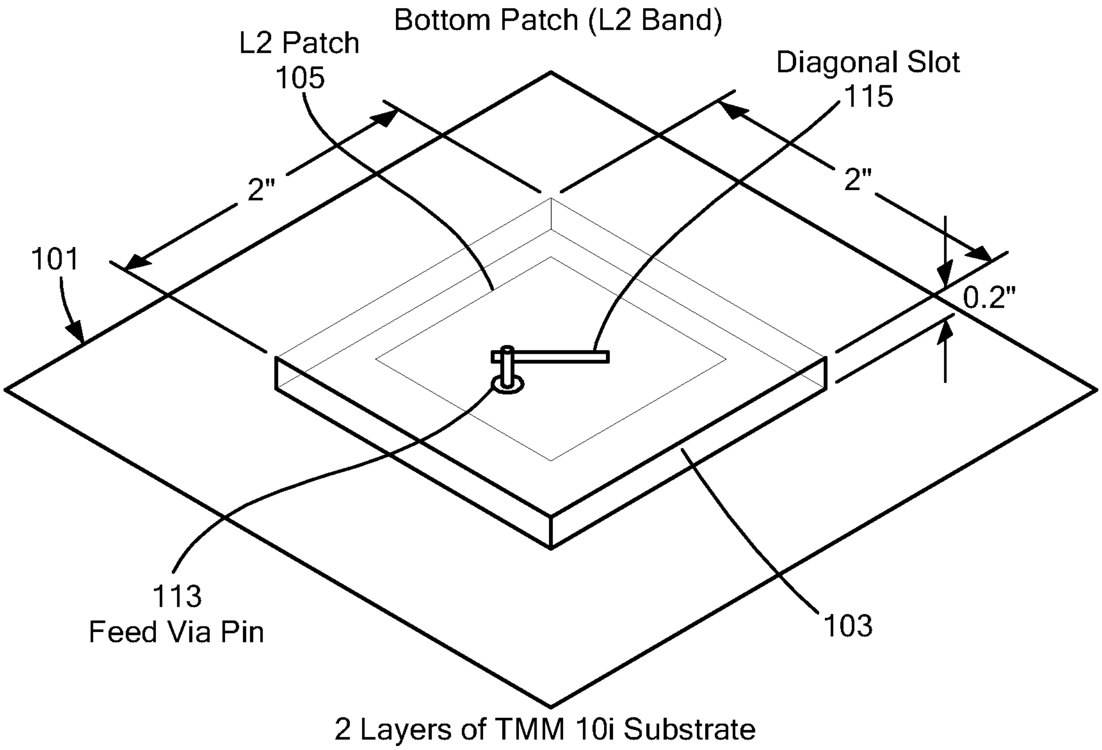
FIG. 1B is partial perspective view of FIG. 1A showing a bottom patch of a dual-band circularly-polarized stacked center-slotted patch antenna without a top patch.

The first patch 105 is a conductive material (e.g., metal, copper, etc.) on the first substrate 103. In an example embodiment, the first patch 105 may be rectangular, square, or any shape within the dimensions of the first substrate 103. In an example, the first patch 105 (e.g., lower patch) may not be directly connected to the feed connector 113 (e.g., the first patch 105 may not be directly connected to a center pin of the feed connector 113 when the feed connector 113 is a coaxial connector) but may be capacitively coupled to the feed connector 113 to receive RF energy, by having a void in the first patch 105 to allow electromagnetic coupling of RF energy from the feed connector 113 to the first patch 105. In an example, only the second patch 109 may be directly connected to the feed connector 113 (e.g., the second patch 109 may be soldered to the feed connector 113). In an example embodiment, the first patch 105 may be connected to the center connector of a coaxial connector or pin used as the feed connector 113 as illustrated in FIG. 2 and described below in more detail, where the center conductor of the coaxial conductor used as the feed connector 113 supplies RF power to the first patch 105. In an example embodiment, the first patch 105 may include a first diagonal non-radiating center slot 115 as illustrated in FIG. 1B and described below in greater detail. In an example embodiment, the first diagonal non-radiating center slot 115 may be oriented at approximately 45 degrees from a side of the first patch 105 and may be rotated to independently change orthogonal polarization components. A center-slot on a patch may be less susceptible to element-to-element coupling because edge fields may be less perturbed when placed close to each other in an arrayed configuration. A probe feed provides low cost and low complexity. In an example, more than two patches may be used, where a feed connector is directly connected to a top-most patch and capacitively coupled to the other (e.g., lower) patches.

The second substrate 107 is an insulating material (e.g., ceramic) on the first patch 105 and the first substrate 103. In an example embodiment, the second substrate 107 may be an isotropic thermoset microwave material (i.e., a ceramic thermoset polymer composite) such as Rogers Corporation TMM® 10i laminate. The second substrate 107 is illustrated in FIG. 1A as being 2 inches long, 2 inches wide, and 0.2 inches high, which is the same dimensions as the first substrate 103. However, the present disclosure is not limited thereto. The second substrate 107 may be any dimension.

The second patch 109 is a conductive material (e.g., metal, copper, etc.) on the second substrate 107. In an example embodiment, the second patch 109 may be rectangular, square, or any shape within the dimensions of the second substrate 107. In an example embodiment, the second patch 109 may be directly connected to the center connector of a coaxial connector or pin used as the feed connector 113 as illustrated in FIG. 2 and described below in more detail, where the center conductor of the coaxial conductor used as the feed connector 113 supplies RF power to the second patch 109. The single feed connector 113 excites each of the first patch 105 and the second patch 109 and simplifies a fabrication process. In an example embodiment, the second patch 109 may include a second diagonal non-radiating center slot 111.

In an example embodiment, the second diagonal non-radiating center slot 111 may be oriented at approximately 45 degrees and may be rotated to independently change orthogonal polarization components. In an example embodiment, the second diagonal non-radiating center slot 111 on the second patch 109 may be in the same orientation as the first diagonal non-radiating center slot 115 on the first patch 105 to enable right-hand circular polarizing (RHCP). In an example embodiment, the second diagonal non-radiating center slot 111 on the second patch 109 may be in an opposite orientation to that of the first diagonal non-radiating center slot 115 on the first patch 105 to enable left-hand circular polarizing (LHCP). Non-radiating diagonal center slots enable a phase delay in currents which excite two orthogonally polarized electric fields. A diagonal center slot is a tuning feature which does not perturb electric fields at an edge of the stacked patch antenna 100, which allows the stacked patch antenna 100 to be more closely spaced in a Controlled Reception Pattern Antenna (CRPA) array configuration as illustrated in FIG. 3 and described below in greater detail.

In an example embodiment, the second patch 109 (e.g., an upper or top patch) may be offset from the first patch 105 (e.g., a lower or bottom patch) in a "diving board" configuration to provide addition tuning feature for impedance matching of an upper frequency band antenna as illustrated in FIG. 2 and described below in greater detail.

The feed connector 113. In an example embodiment, the feed connector 113 may be a coaxial connector or pin, where an outer conductor of the coaxial connector may be directly connected to the ground plane 101 and a center connector of the coaxial connector may be capacitively couple, by having a void in the first patch 105 around the feed connector 113, but not directly connected, to the first patch 105 to supply RF power to the first patch 105 as illustrated in FIG. 2 and described below in more detail.

The stacked patch antenna 100 exhibits reduced coupling which improves antenna performance as compared to a corner-clipped patch antenna. Thus, the stacked patch antenna 100 exhibits better gain and phase dispersion characteristics which are favorable for anti-jamming algorithms and null-steering.

Circular polarization in the stacked patch antenna 100 may be less perturbed by coupling from adjacent patch antenna elements as compared to a corner-clipped, or a rectangular, circularly-polarized stacked patch antenna. Thus, the stacked patch antenna 100 may exhibit improved gain and phase flatness, especially at a waterline.

FIG. 1B is a partial perspective view of FIG. 1A showing the first patch 105 of the stacked patch antenna 100 of FIG. 1A but not the second patch 109. In an example embodiment, the first patch 105 may be on the first substrate 103, which may be on the ground plane 101. The feed connector 113 (e.g., a coaxial connector) may be capacitively couple, through a void in the first patch 105 around the feed connector 113, but not directly connected, to the first patch 105 via a center conductor of the feed connector 113, where an outer conductor of the feed connector 113 may be directly connected to the ground plane 101. In an example embodiment, the first patch 105 includes a first diagonal non-radiating center slot 115 as described above in greater detail.

FIG. 2 is an illustration of an example embodiment of the stacked patch antenna 100 with offset impedance tuning. In an example embodiment, the first substrate 103 has the first patch 105 thereon. The second substrate 107 is on the first patch 105 and overlaps the first substrate 103. The second patch 109 is on the second substrate 107 and overlaps and is offset from the first patch 105 in a "diving board" configuration to provide an additional tuning feature for impedance matching of an upper frequency band of the stacked patch antenna 100. Since the first diagonal non-radiating center slot 115 and the second diagonal non-radiating center slot 111 are not radiating they need not be oriented in an fashion relative to each other but may be used as independent tuning features in terms RHCP or LHCP purity. The first diagonal non-radiating center slot 115 and the second diagonal non-radiating center slot 111 may be oriented approximated 45 degrees with respect to square/rectangular patches. The angle may be varied to slightly improve circular polarization performance. The diving board style configuration between the first patch 105 and the second patch 109 allows for each patch to be properly impedance matched without any addition matching circuits or board layers. Patches which are capacitively coupled (e.g., through a void in the first patch 105 around the feed connector 113) to the feed connector 113 (e.g. the first patch 105 which does not make direct contact to the feed connector 113) may have a circle diameter (e.g., a capacitive-coupling area between the first patch 105 and the feed connector 113) varied as an additional impedance matching mechanism.

In an example embodiment, the feed connector 113 comprises a coaxial connector with an outer conductor directly connected to the ground plane 101 and a center conductor capacitively coupled (e.g., through a void in the first patch 105 around the feed connector 113), but not directly connected, to the first patch 105 and directly connected to the second patch 109 to supply RF power to the first patch 105 and the second patch 109.

In an example embodiment, the first patch 105 comprises a first diagonal non-radiating center slot 115 and the second patch 109 comprises a second diagonal non-radiating center slot 111 as described above in greater detail. In FIG. 2, the first diagonal non-radiating center slot 115 and the second diagonal non-radiating center slot 111 are shown as being similarly oriented. However, the present disclosure is not limited thereto. In an example embodiment, the first diagonal non-radiating center slot 115 and the second diagonal non-radiating center slot 111 may have opposite orientations as described above in greater detail.

Figure 3A:
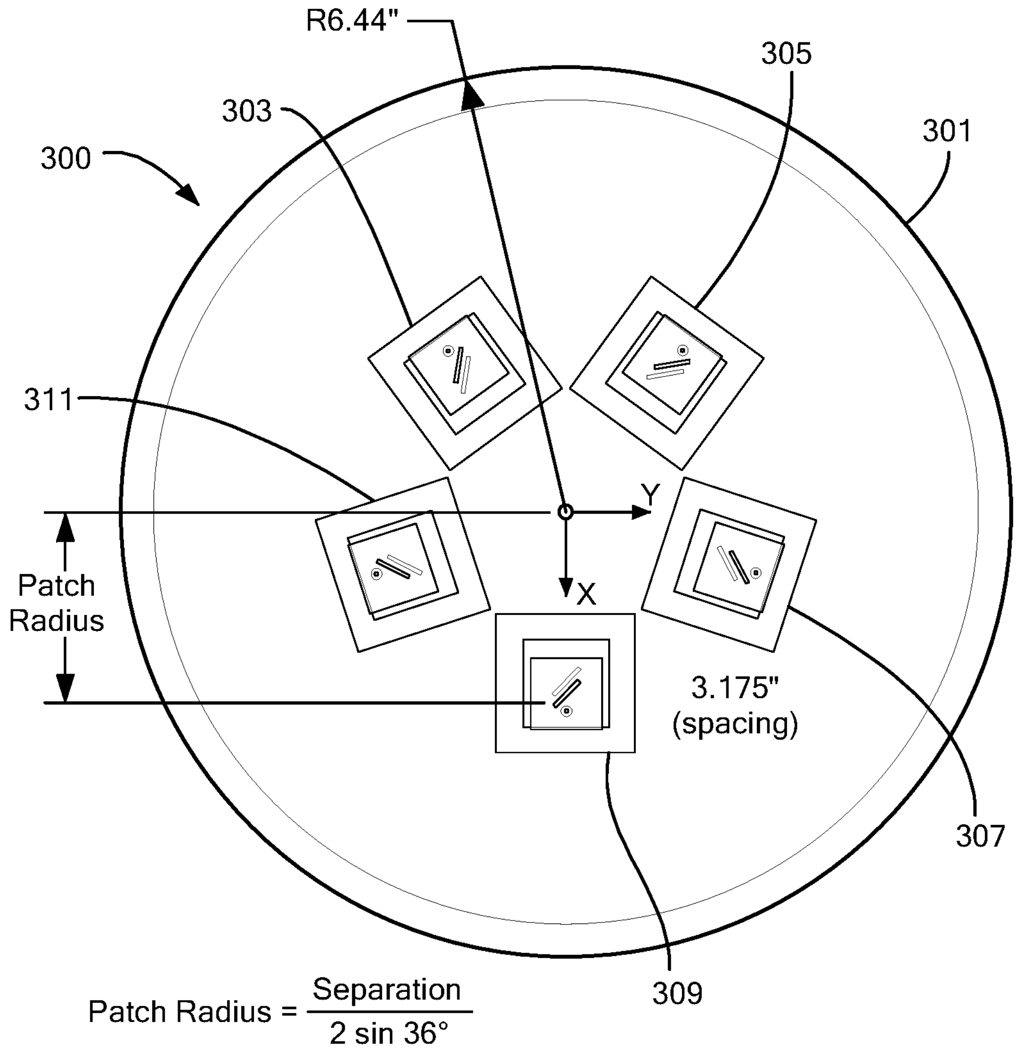
FIG. 3A is an illustration of an example embodiment of a top-view of an array of dual-band circularly-polarized stacked center-slotted patch antennas.

FIG. 3A is an illustration of an example embodiment of a top-view of an array 300 of stacked patch antennas 303, 305, 307, 309, and 311. In an example embodiment, each of the stacked patch antennas 303, 305, 307, 309, and 311 may be identical to the stacked patch antenna 100 of FIG. 1A and described above in greater detail.

FIG. 3A illustrates an array of five stacked patch antennas 303, 305, 307, 309, and 311 arranged in circular fashion on a substrate 301 having a radius of 6.44 inches, a spacing between stacked patch antennas 303, 305, 307, 309, and 311 of 3.175 inches and a patch radius between adjacent stacked patch antennas 303, 305, 307, 309, and 311 of a separation (e.g., separations of 2.85 inches, 3.75 inches, 4.75 inches, etc.) between adjacent stacked patch antennas 303, 305, 307, 309, and 311 divided by 2 sin 36 degrees. However, the present disclosure is not limited there to. Other numbers of stacked patch antennas 101 may be arrayed with a different spacing and a different patch radius.

In an example embodiment, the substrate 301 may be metal (e.g., Aluminum (Al) for low temperatures, Titanium (Ti) for high temperatures, etc.).

Figure 3B:
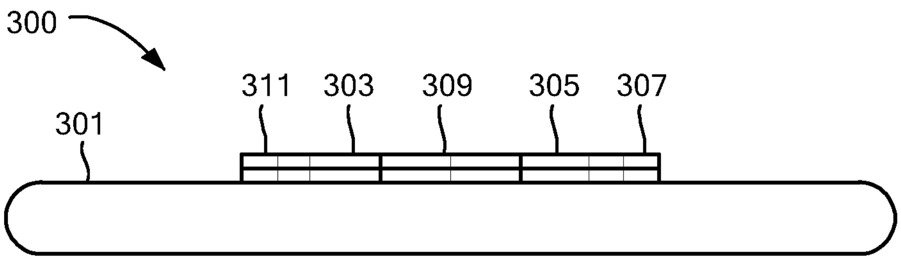
FIG. 3B is an illustration of an example embodiment of a side-view of the array of dual-band circularly-polarized stacked center-slotted patch antennas in FIG. 3A.

FIG. 3B is a side-view of the array of array of five stacked patch antennas 303, 305, 307, 309, and 311 of FIG. 3B.

Figure 4:
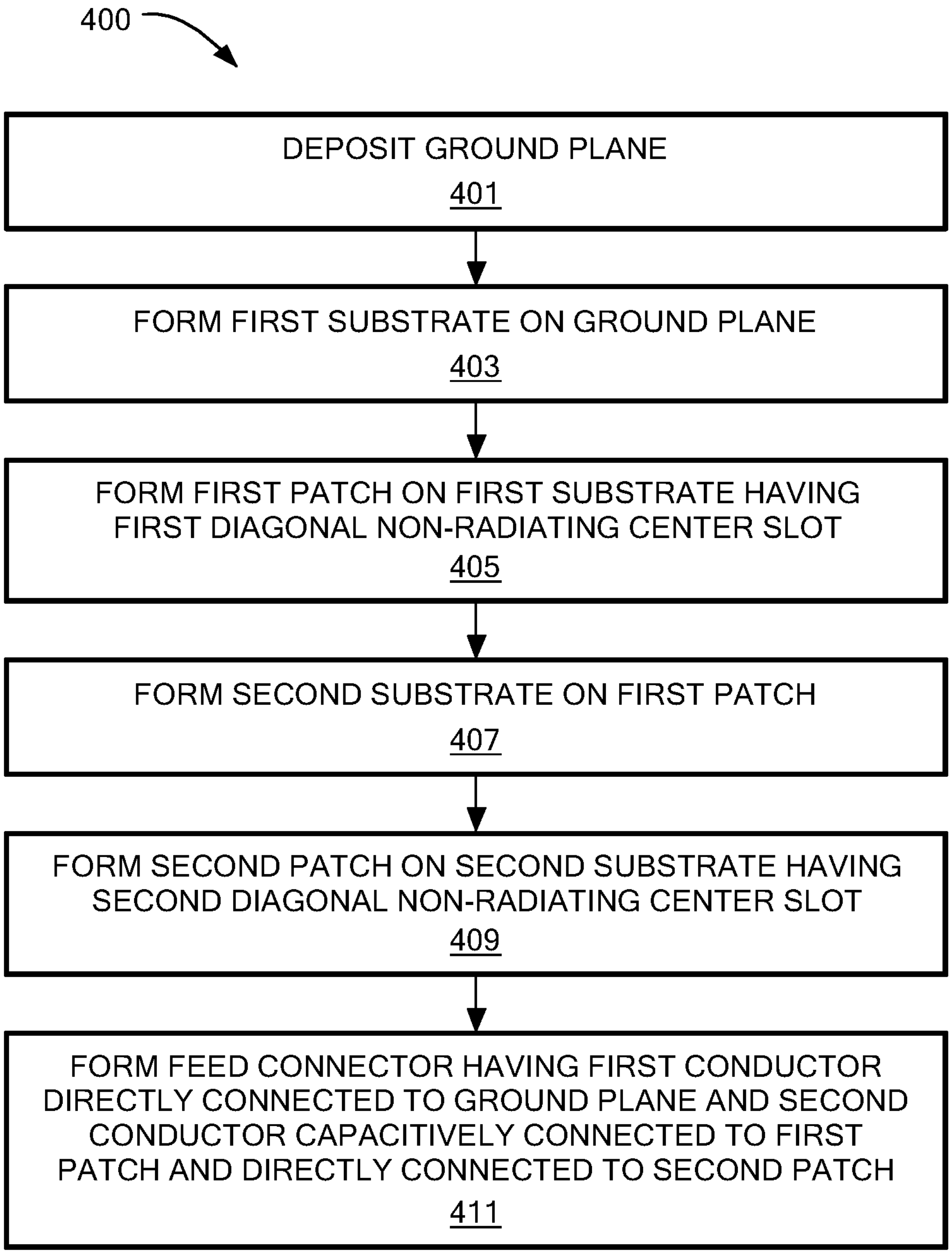
FIG. 4 is a flowchart of an example method of constructing a dual-band circularly-polarized stacked center-slotted patch antenna.

FIG. 4 is a flowchart of an example method 400 of fabricating a stacked patch antenna, the method 400 comprises depositing a ground plane in step 401.

Step 403 of the method 400 comprises forming a first substrate on the ground plane. Step 405 of the method 400 comprises forming a first patch on the first substrate having a first diagonal non-radiating center slot. Step 407 of the method 400 comprises forming a second substrate on the first patch. Step 409 of the method 400 comprises forming a second patch on the second substrate having a second diagonal non-radiating center slot. Step 411 of the method 400 comprises forming a feed connector having a first conductor directly connected to the ground plane and a second conductor capacitively conductively connected, but not directly connected, to the first patch and directly connected to the second patch.

Having described exemplary embodiments of the disclosure, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable sub combination. Other embodiments not specifically described herein are also within the scope of the following claims.

Various embodiments of the concepts, systems, devices, structures and techniques sought to be protected are described herein with reference to the related drawings. Alternative embodiments can be devised without departing from the scope of the concepts, systems, devices, structures and techniques described herein.

It is noted that various connections and positional relationships (e.g., over, below, adjacent, etc.) are set forth between elements in the above description and in the drawings. These connections and/or positional relationships, unless specified otherwise, can be direct or indirect, and the described concepts, systems, devices, structures and techniques are not intended to be limiting in this respect. Accordingly, a coupling of entities can refer to either a direct or an indirect coupling, and a positional relationship between entities can be a direct or indirect positional relationship.

As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s). The following definitions and abbreviations are to be used for the interpretation of the claims and the specification. As used herein, the terms "comprises," "comprising, "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance, or illustration. Any embodiment or design described herein as "exemplary" is not necessarily to be construed as preferred or advantageous over other embodiments or designs. The terms "one or more" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

References in the specification to "one embodiment, "an embodiment," "an example embodiment," etc., indicate that the embodiment described can include a particular feature, structure, or characteristic, but every embodiment can include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description herein, terms such as "upper," "lower," "right," "left," "vertical," "horizontal, "top," "bottom," (to name but a few examples) and derivatives thereof shall relate to the described structures and methods, as oriented in the drawing figures. The terms "overlying," "atop," "on top, "positioned on" or "positioned atop" mean that a first element, such as a first structure, is present on a second element, such as a second structure, where intervening elements such as an interface structure can be present between the first element and the second element. The term "direct contact" means that a first element, such as a first structure, and a second element, such as a second structure, are connected without any intermediary elements. Such terms are sometimes referred to as directional or positional terms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways.

Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

What is claimed is:

1. A stacked patch antenna, comprising:
- a ground plane;
- a first substrate on the ground plane;
- a first patch on the first substrate having a first diagonal non-radiating center slot from a side of the first patch;
- a second substrate on the first patch;
- a second patch on the second substrate having a second diagonal non-radiating center slot from a side of the second patch similar to the side of the first patch, wherein the second patch overlaps and is offset from the first patch to enable offset impedance tuning; and
- a feed connector having a first conductor directly connected to the ground plane and a second conductor capacitively connected to the first patch and directly connected to the second patch.

2. The stacked patch antenna of claim 1, wherein the ground plane is a metal.

3. The stacked patch antenna of claim 1, wherein the feed connector is a coaxial connector.

4. The stacked patch antenna of claim 1, wherein each of the first substrate and the second substrate comprises an insulator.

5. The stacked patch antenna of claim 4, wherein the insulator comprises an isotropic thermoset microwave material.

6. The stacked patch antenna of claim 1, wherein the first diagonal non-radiating center slot and the second diagonal non-radiating center slot have a same orientation.

7. The stacked patch antenna of claim 1, wherein the first diagonal non-radiating center slot and the second diagonal non-radiating center slot have opposite orientations.

8. The stacked patch antenna of claim 1, wherein the second patch overlaps the first patch in a diving board configuration.

9. The stacked patch antenna of claim 1, wherein the ground plane is 4 inches by 4 inches, the first substrate and the second substrate are each 2 inches by 2 inches, and a height of each of the first substrate and the second substrate is 0.2 inches.

10. An array of stacked patch antennas, comprising:
- a plurality of stacked patch antennas arranged on a substrate, wherein each of the stacked patch antennas comprises:
  - a first substrate on a ground plane;
  - a first patch on the first substrate having a first diagonal non-radiating center slot from a side of the first patch;
  - a second substrate on the first patch;
  - a second patch on the second substrate having a second diagonal non-radiating center slot from a side of the second patch similar to the side of the first patch, wherein the second patch overlaps and is offset from the first patch to enable offset impedance tuning; and
  - a feed connector having a first conductor directly connected to the ground plane and a second conductor capacitively connected to the first patch and directly connected to the second patch.

11. The array of stacked patch antennas of claim 10, wherein the plurality of stacked patch antennas comprises five stacked patch antennas arranged in circular fashion with a spacing between adjacent stacked patch antennas of 3.175 inches.

12. The array of stacked patch antennas of claim 11, wherein adjacent stacked patch antennas have a patch radius of separation in inches between adjacent stacked patch antennas divided by 2 sin 36 degrees.

13. A method of fabricating a stacked patch antenna, comprising:
- depositing a ground plane;
- forming a first substrate on the ground plane;
- forming a first patch on the first substrate having a first diagonal non-radiating center slot from a side of the first patch;
- forming a second substrate on the first patch;
- forming a second patch on the second substrate having a second diagonal non-radiating center slot from a side of the second patch similar to the side of the first patch, wherein the second patch overlaps and is offset from the first patch to enable offset impedance tuning; and forming a feed connector having a first conductor directly connected to the ground plane and a second conductor capacitively connected to the first patch and directly connected to the second patch.

14. The method of claim 13, wherein the ground plane is a metal.

15. The method of claim 13, wherein each of the first substrate and the second substrate comprises an insulator.

16. The method of claim 15, wherein the insulator comprises an isotropic thermoset microwave material.

17. The method of claim 13, wherein the first diagonal non-radiating center slot and the second diagonal non-radiating center slot have a same orientation.

18. The method of claim 13, wherein the first diagonal non-radiating center slot and the second diagonal non-radiating center slot have opposite orientations.

19. The method of claim 13, wherein the second patch overlaps the first patch in a diving board configuration.

20. The method of claim 13, wherein the ground plane is 4 inches by 4 inches, the first substrate and the second substrate are each 2 inches by 2 inches, and a height of each of the first substrate and the second substrate is 0.2 inches.

* * * * *